United States Patent [19]
Brown

[11] Patent Number: 4,725,105
[45] Date of Patent: Feb. 16, 1988

[54] SIMPLIFIED ANTI-LOCK BRAKING SYSTEM

[75] Inventor: George E. Brown, Niles, Mich.

[73] Assignee: Allied Corporation, Morristown, N.J.

[21] Appl. No.: 903,333

[22] Filed: Sep. 3, 1986

[51] Int. Cl.[4] .............................. B60T 8/40; B60T 8/34
[52] U.S. Cl. ...................................... 303/116; 303/113
[58] Field of Search ............... 188/181 A; 303/61, 68, 303/113, 114, 115, 116, 119

[56] References Cited

U.S. PATENT DOCUMENTS

| | | | |
|---|---|---|---|
| 3,524,684 | 11/1968 | Skoyles | 303/116 |
| 3,690,736 | 9/1972 | Smirl et al. | 303/115 |
| 3,795,423 | 3/1974 | Shields et al. | 303/115 |

FOREIGN PATENT DOCUMENTS 8429985 11/1984 United Kingdom ................ 303/119

Primary Examiner—Andres Kashnikow
Assistant Examiner—T. Newholm
Attorney, Agent, or Firm—Ken C. Decker; Larry J. Palguta

[57] ABSTRACT

An anti-lock braking system which incorporates a pressure modulator disposed between a master cylinder and one or more wheel cylinders of the vehicle. The pressure modulator includes an electrically operated pump for pumping fluid from the rear cylinders back to the master cylinder and a pressure responsive isolating valve for isolating the wheel cylinders from the master cylinder in response to operation of the pump. The system is particularly well suited for application to the rear wheels of the vehicle.

13 Claims, 2 Drawing Figures

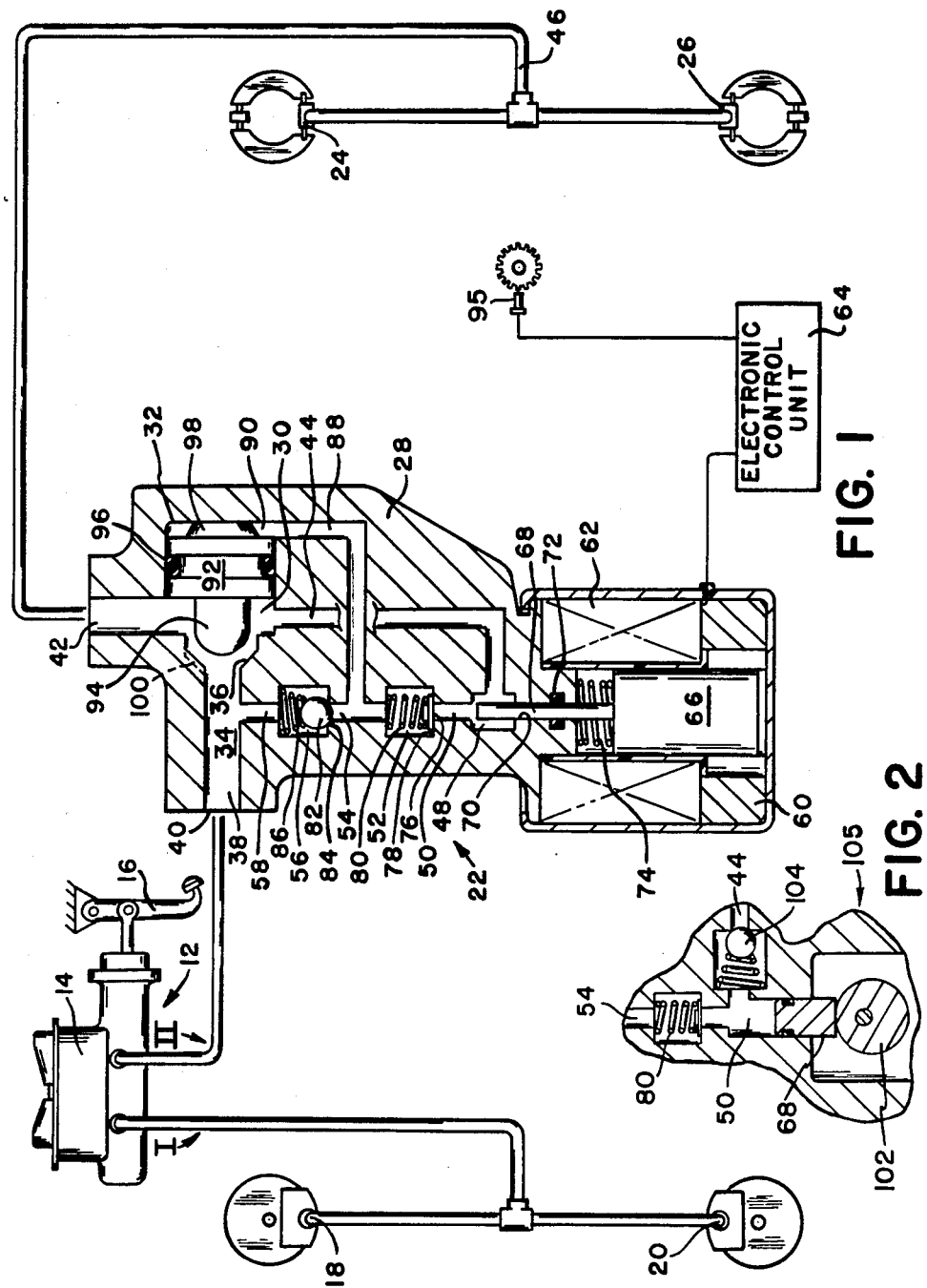

SIMPLIFIED ANTI-LOCK BRAKING SYSTEM

BACKGROUND OF THE INVENTION

The present invention relates to anti-lock braking systems and in particular to an anti-lock braking system which incorporates an integrated modulating valve and brake pressure reducing pump, actuated by an electronic control system responsive to rotational behavior of a vehicle's wheels, the system being particularly applicable to anti-lock control of the rear wheels of a vehicle.

Anti-lock braking systems are well known. Typically, prior art anti-lock braking systems have evolved from mechanical to sophisticated electronically-controlled devices which sense the rotational behavior of a vehicle's wheels during braking and assume control of braking of the vehicle upon sensing an imminent skid condition to automatically modulate the application of braking pressure to avoid wheel-lock. Typically, these systems incorporate a power boosted master cylinder or a full power hydraulic system to produce the required pressurized braking fluid. The systems are normally divided into a plurality of hydraulic circuits with braking of the front wheels of the vehicle being individually controlled and the rear wheels of the vehicle being controlled either individually or as a pair. Such systems can be highly effective. Such systems are, however, complex and expensive, a factor which reduces their availability and widespread implementation.

There exist numerous applications for anti-lock braking systems in which substantial improvements in the braking performance of the vehicle can be enhanced without the requirement of controlling three or more wheels of the vehicle. Such applications typically include pick-up trucks and vans. In these applications, due to the substantial variation in loading of the rear wheels of the vehicle, it is possible to have a vehicle that is lightly loaded be very subject to locking of the rear wheels. Various brake pressure proportioning devices have been proposed to alleviate this problem but such devices have been less than fully effective, due to substantial variations in friction materials and other variable parameters of the braking system.

There therefore exists a need for a simple, low cost anti-lock braking system which is adaptable for applications such as pick-up trucks and vans which can substantially reduce the potential of rear wheel lock with a minimum of cost and complexity.

There also exists a need for such a system which can be used with braking systems incorporating vacuum boosted modulators, and any of various hydraulically boosted systems.

Broadly, the present invention is an anti-lock braking system which comprises a master cylinder means for generating pressurized braking fluid in a hydraualic circuit which includes at least one wheel cylinder. Means are provided for sensing the rotational behavior of a vehicle wheel and generating a signal corresponding thereto. A control circuit is connected to the sensor means for receiving these signals and generating control signals in response to an incipient wheel-lock condition. A brake pressure modulator is operatively connected to the hydraulic circuit between the master cylinder and the wheel cylinder. The pressure modulator includes a pump for pumping fluid from the wheel cylinder to the master cylinder, and a pressure reducing means connected between the pump means and the master cylinder for producing a pressure drop thereacross in response to the flow of fluid therethrough. An isolating valve is provided, the valve having an inlet port, wheel cylinder outlet port, a pump outlet port, and a control port. The ports are connected to the master cylinder, wheel cylinder, the inlet of the pump means, and the input of the pressure reducing means, respectively. The isolating valve normally establishes fluid communication between the inlet, wheel cylinder, and pump inlet ports and includes an element operable in response to a pressure drop across the pressure reducing means to isolate the inlet port from the wheel cylinder and pump inlet ports. The pump means is responsive to the signals from the control means to pump fluid from the wheel cylinder to the master cylinder to thereby reduce the pressure of braking fluid therein.

It is therefore an object of the invention to provide an improved anti-lock braking system.

Another object of the invention is to provide an anti-lock braking system of reduced cost and complexity.

Still another object of the invention is to produce an anti-lock braking system particularly well suited for use in preventing lock of the rear wheels of a vehicle.

Another object of the invention is to provide an anti-lock braking system which includes a self-contained electrically operated pump and an isolating valve operable in response to signals from a control circuit and fluid flow from the pump, respectively, to pump fluid from a wheel cylinder and reduce the pressure therein.

These and other objects and purposes of the invention and the invention itself will be best understood in view of the following detailed description thereof taken in conjunction with the appended drawings wherein:

FIG. 1 shows an anti-lock braking system in accordance with the present invention, portions thereof being shown in schematic format; and FIG. 2 is a fragmentary drawing of an alternative pump for use in the invention.

DESCRIPTION OF PREFERRED EMBODIMENT

Referring now to the drawing there is shown an anti-lock braking system which comprises generally a master cylinder 12, typically a dual cylinder displacement type of master cylinder including a reservoir 14 and actuated by a foot pedal 16. Master cylinder 12 has two output circuits, I, II. As illustrated, hydraulic circuit I is connected to a pair of front wheel brake cylinders 18, 20 and hydraulic circuit II is connected through a pump and modulator assembly 22 to a pair of rear wheel cylinders 24, 26. Master cylinder 12 may be manual or power boosted by means of such as a vacuum booster or a hydraulic booster (not shown). Hydraulic circuits I, II. are fully hydraulically isolated, such systems and components being now well known in the art.

Pump modulator assembly 22 includes a body 28 of irregular configuration. Body 28 is provided with a generally cylindrical, stepped diameter valve chamber 30 having a closed end 32 and provided at its opposite end or master cylinder inlet 34 with a tapered valve seat 36.

An inlet passage 38 communicates axially with valve chamber 30 via the valve seat 36 and is connected at its opposite end 40 to the hydraulic circuit II of master cylinder 12.

A wheel cylinder outlet passage or wheel cylinder port 42 and a pump inlet passage 44 communicate with chamber 30 adjacent valve seat 36. Wheel cylinder outlet passage 42 is connected via fluid conduit 46 to the wheel cylinders 24, 26 associated with the rear wheels of a vehicle (not shown).

Also formed fluidly in series in body 28 are a pump manifold chamber or pressure fluid inlet port 48, pump cylinder 50, stop valve chamber 52, connecting passage or pressure reducing means input port 54, pressure relief or reducing valve chamber 56, and a fluid passage 58 communicating between reducing valve chamber 56 and inlet passage 38. A solenoid 60 includes a coil 62 electrically connected to an electronic anti-lock control unit 64, a plunger 66 connected to a pump piston 68 which extends through a fluid tight bore 70 and "O" ring seal 72. Alternatively, pressurized fluid can be admitted to the coil chamber to provide a fluid balanced system, that is, a system wherein fluid pressure on the opposite ends of piston 68 are balanced. A spring 74 maintains the plunger 66 in its illustrated position. Upon energization of the solenoid coil 62, plunger 66 moves upwardly (as viewed in the drawings) causing the piston 68 to move into the pump cylinder 50.

Stop valve chamber 52 has disposed therein an annular stop valve element 76 resiliently maintained against a shoulder 78 of chamber 52 by a coil spring 80.

Similarly, a ball valve 82 is received in reducing valve chamber 56, ball valve 82 being maintained against a valve seat 84 in chamber 56 by a coil spring 86.

A fluid passage 54 connects stop valve chamber 52 and the pressure reducing valve chamber 56 to fluid passage 88 and to the end 90 of valve chamber 30 axially opposite inlet passage 38. Inlet passage 44 communicates chamber 30 with the pump inlet chamber 48.

A valve element 92 is reciprocally received in valve chamber 30. Valve element 92 is provided with a valve closure portion 94 movable into engagement with the valve seat 36 to close the inlet passage 38. Preferably, an "O" ring seal 96 is fitted to the valve element 92 to provide fluid tight isolation thereacross. The end 98 of the valve element 92 is of reduced diameter to provide a fluid receiving space between the valve element 92 and the end 90 of chamber 30.

Lastly, a speed sensing device 95, typically a magnetic sensor associated with rotating tone wheel or the like is operatively connected to the drive shaft of the rear wheels of the vehicle (not shown). This sensor, as is now well known to those skilled in the art, provides a signal proportional to the speed of the wheels associated with wheel cylinders 24, 26. This signal is applied to the electronic control unit 64. The control unit itself includes a computing circuit which will analyze the rotational behavior of the wheels of the vehicle to determine the occurence of an incipient skid condition. Based on this information, control signals are generated by the electronic control unit 64 to apply an operating signal to the solenoid coil 62 to effect reduction in pressure of fluid applied to the wheel cylinders 24, 26.

Under normal braking conditions, valve element 92 remains in its rightmost position as is shown in the drawing. Pressurized braking fluid in hydraulic circuit II passes through the passage 38, valve chamber 30, and to wheel cylinders 24, 26 via passage 42 and fluid conduit 46. This same pressure is also provided to pump inlet chamber 48 via fluid passage 44. When the electronic control unit 64 determines that the wheels are being braked excessively and an incipient lock condition exists, a control signal is generated to energize solenoid coil 62. This moves the plunger 66 vertically (as shown in the drawing) moving the piston 68 into the piston cylinder 50. This forces a quantity of brake fluid from the cylinder 50 past the stop valve 76 and pressure reducing valve element 82. Action of the pressure reducing valve 82 creates pressure drop in the fluid as it passes from passage 54 to the inlet passage 38. The higher pressure in passage 54 is conveyed via passage 88 to the end 98 of valve element 92. Because this pressure is higher than pressure at the inlet passage 38, valve element 92 moves to the left (as viewed in the drawings). With repetitive solenoid action, valve element 92 fully travels so that valve closure portion 94 seals against seal 36. This isolates master cylinder 12 from the wheel cylinders 24, 26. Simultaneously, fluid pumped from the cylinder 50 forces a similar quantity of fluid backwardly through the inlet passage 38 thereby withdrawing a small quantity of fluid from the wheel cylinders 24, 26 via wheel cylinder outlet passage 42, valve chamber 30, and pump inlet passage 44. This, accordingly, reduces the pressure in the wheel cylinders 24, 26. Continued existence of the incipient skid condition will cause further repetitious operation of the solenoid plunger 66 thereby further reducing pressure in the wheel cylinders 24, 26. This will continue until the incipient skid condition has been alleviated.

When the driver lowers pressure in master cylinder 12, the pressure in passage 38 lowers. If the pressure in the brakes is greater (less the pressure drop across the regulator valve) fluid will return to the master cylinder via passages 42 to 44 to 48 past valve 76 to passage 54, past valve 82 to passage 58 to master cylinder inlet passage 40. When the pressure in chamber 90 is less than in chamber 30, piston 92 moves to its rest position reopening full communication from master cylinder to the brakes.

In the illustrated embodiment, the pump has been illustrated as a solenoid. This configuration provides the least expensive structure. However, in severe spike applications of brakes, it is possible that the solenoid actuated pump will have insufficient capacity to reduce brake pressure rapidly enough to fully avoid a skid or lock condition of the vehicles wheels. Accordingly, this limitation can be alleviated by replacing the solenoid pump with an electric motor pump as shown in FIG. 2. The motor pump 105 incorporates a motor (not shown) driving an eccentric 102 which in turn reciprocates the piston 68. A stop valve 104 may be provided. Because of its higher capacity, the pump 105 will be able to eliminate locking of the vehicles rear wheels even under severe spike applications but with an attendant increase in cost of the system. The system, nonetheless, represents a substantial reduction in the complexity of anti-lock braking systems. Because of its configuration, this system is exceptionally well adapted for applications such as vans and light trucks with the system being applied to the rear wheels only.

In the operation of the system, it should be observed that the stop valve element 76 prevents the passage of fluid from the inlet passage 38 backwardly through piston cylinder 50, chamber 48, and the wheel cylinders 24, 26 during the brief period when the pressure reducing valve 82 remains open and the solenoid pump begins to retract. It should also be observed that a pressure build orifice 100 may be provided in the valve seat 36 to allow for gradual controlled building of pressure in the wheel cylinders 24, 26 when the incipient lock condition has been alleviated and/or the brake pressure in the wheel cylinders 24, 26 has been reduced by an amount greater than necessary.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What I claim is:

1. An anti-lock braking system comprising: master cylinder means for generating pressurized braking fluid in a hydraulic circuit which includes at least one wheel cylinder, control means for generating control signals in response to an incipient wheel skid condition, and a brake pressure modulator operatively connected to said hydraulic circuit between said master cylinder means and said wheel cylinder, said brake pressure modulator including pump means responsive to said control signals from said control means for pumping fluid from said wheel cylinder to said master cylinder, pressure reducing means connected between said pump means and said master cylinder for producing a pressure drop thereacross in response to flow of fluid from said pump means, an isolating valve having a master cylinder inlet, a wheel cylinder outlet, a pressure fluid inlet of the pump, and a pressure reducing means input, and ports connected to said master cylinder, said wheel cylinder, the inlet of said pump means, and the input of said pressure reducing means, respectively, said isolating valve normally establishing fluid communication between said master cylinder inlet port, wheel cylinder outlet port and pressure fluid inlet port and including means connected to said pressure reducing means and operable in response to a pressure drop thereacross for isolating said master cylinder inlet port from said wheel cylinder port and pump means inlet port.

2. The system of claim 1 wherein said isolating valve includes a valve chamber, said master cylinder inlet, wheel cylinder outlet, and pressure fluid inlet communicating therewith, and a valve element disposed between said master cylinder inlet and said wheel cylinder port, fluid inlet port, and inlet port and slideable in said chamber between an open position displaced from said master cylinder port and a closed position closing said master cylinder port.

3. The system of claim 2 wherein said chamber is generally cylindrical, said valve element being axially slideable therein and forming a fluid tight seal between said master cylinder inlet and said wheel cylinder fluid inlet, and input ports.

4. The system of claim 3 wherein said wheel cylinder and pump means inlet ports communicate through said chamber in all positions of said valve element.

5. The system of claim 1 wherein said said pressure reducing means includes a ball valve and a valve seat, and spring means for maintaining said ball valve against the said seat in a direction opposite the flow of fluid therethrough.

6. The system of claim 5 wherein said pump means includes a solenoid having a plunger, a pump piston operatively connected to said plunger, and a piston cylinder formed in said body.

7. The system of claim 6 further including a stop valve connected fluidly in series between said pump means and said pressure reducing means.

8. The system of claim 1 wherein said pump means is a motor driven pump.

9. The system of claim 1 wherein said control means includes a speed sensor operatively connected to a drive shaft associated with rear wheels of a vehicle, said brake pressure modulator being connected between said master cylinder and the wheel cylinders associated with the rear wheels of said vehicle.

10. The system of claim 9 wherein said master cylinder is a dual piston displacement type master cylinder, there being one said pressure modulator connected fluidly in series between one of the pistons of said master cylinder and the rear wheel cylinders of said vehicle.

11. The system of claim 2 further including an orifice communicating between said master cylinder inlet port and said wheel cylinder port when said valve element is in said closed position.

12. The system of claim 6 wherein said plunger is disposed in a chamber communicating with said pump means inlet port whereby fluid pressure on said pump piston is balanced.

13. The system of claim 11 wherein said orifice is variable in proportion to movement of said valve element whereby the flow rate of braking fluid through said orifice is variable as a function of the position of the element.

* * * * *